United States Patent
Goebel et al.

(10) Patent No.: US 7,680,376 B2
(45) Date of Patent: Mar. 16, 2010

(54) WAFER-LEVEL ALIGNMENT OF OPTICAL ELEMENTS

(75) Inventors: Andreas Goebel, Mountain View, CA (US); Gregory L. Wojcik, Ben Lomond, CA (US); Lawrence C. West, San Jose, CA (US)

(73) Assignee: Applied Materials, Inc., Santa Clara, CA (US)

(*) Notice: Subject to any disclaimer, the term of this patent is extended or adjusted under 35 U.S.C. 154(b) by 0 days.

(21) Appl. No.: 11/771,642

(22) Filed: Jun. 29, 2007

(65) Prior Publication Data

US 2008/0050081 A1    Feb. 28, 2008

Related U.S. Application Data

(60) Provisional application No. 60/806,339, filed on Jun. 30, 2006.

(51) Int. Cl.
G02B 6/30 (2006.01)
G02B 6/26 (2006.01)
G02B 6/42 (2006.01)

(52) U.S. Cl. .............................. 385/52; 385/14; 385/49

(58) Field of Classification Search .................. 385/14, 385/49, 52
See application file for complete search history.

(56) References Cited

U.S. PATENT DOCUMENTS

| | | | |
|---|---|---|---|
| 4,772,787 A * | 9/1988 | Trommer | 250/227.29 |
| 4,945,400 A * | 7/1990 | Blonder et al. | 257/116 |
| 5,357,103 A * | 10/1994 | Sasaki | 250/227.24 |
| 6,330,377 B1 * | 12/2001 | Kosemura | 385/14 |
| 6,406,196 B1 * | 6/2002 | Uno et al. | 385/89 |
| 6,491,447 B2 * | 12/2002 | Aihara | 385/92 |
| 6,793,407 B2 * | 9/2004 | Jacobowitz et al. | 385/88 |
| 6,793,410 B2 * | 9/2004 | Nakanishi et al. | 385/92 |
| 6,819,836 B2 * | 11/2004 | Murali | 385/39 |
| 7,125,176 B1 * | 10/2006 | Stafford et al. | 385/94 |
| 7,263,248 B2 * | 8/2007 | Windover | 385/14 |
| 2007/0110361 A1 * | 5/2007 | Harden et al. | 385/14 |

* cited by examiner

*Primary Examiner*—Uyen-Chau N Le
*Assistant Examiner*—Daniel Petkovsek
(74) *Attorney, Agent, or Firm*—Townsend and Townsend and Crew, LLP

(57) ABSTRACT

Methods are disclosed of fabricating an optical assembly. An active optical element is disposed near or on a first surface of a slab of optical material. A passive optical element is formed on a second surface of the slab, with the second surface being substantially parallel to the first surface. An optical axis of the passive optical element is aligned with an optical path between the passive optical element and an active region of the active optical element using a lithographic alignment process.

16 Claims, 5 Drawing Sheets

WAFER-LEVEL ALIGNMENT OF OPTICAL ELEMENTS

CROSS-REFERENCES TO RELATED APPLICATIONS

This application is a nonprovisional of, and claims the benefit of the filing date of, U.S. Prov. Pat. Appl. No. 60/806,339, entitled "WAFER-LEVEL ALIGNMENT OF OPTICAL ELEMENTS," filed Jun. 30, 2006 by Andreas Goebel et al., the entire disclosure of which is incorporated herein by reference for all purposes.

BACKGROUND OF THE INVENTION

This application relates generally to the alignment of optical elements. More specifically, this application relates to the alignment of optical elements using lithographic processes.

There are a number of applications in which optical elements need to aligned. Of particular interest are laser and detector optical subassemblies, including transmit optical subassemblies ("TOSAs") and reflect optical subassemblies ("ROSAs"), which typically require high alignment accuracy. Laser emitters often require especially high position accuracy, with a tolerance much less than 1 µm to achieve high-efficiency coupling. This is because waveguide-based edge emitting laser diodes, and sometimes light-emitting diodes, typically have optically active regions emitting beam diameters on the order of 1 µm high by 3 µm wide. Such a source accordingly needs to be imaged rather precisely onto an optical element like a lens, fiber, or other optical structure to within submicron precision. Other laser sources such as Vertical Cavity Surface Emitting Lasers ("VCSELs") have beams on the order of 5 µm and still require precision alignment.

Alignment of distinct physical parts may be an expensive procedure and must take into account a number of different issues when coupling light into or out of an optical package with high efficiency. The optical beam must be formed efficiently to match the beam shape between the parts to be coupled. Mechanical alignment of the parts to high accuracy for high-efficiency coupling often requires active feedback from optical beams traversing the part to measure the alignment position properly. Such a procedure usually requires one or more optical components being powered to emit or detect light and securing them while aligned. Such a power-on active alignment process is difficult if the part being activated is the one being manipulated to achieve the alignment. In order to achieve alignment in these ways, it is also generally necessary to provide a rigid structure that remains stable with high accuracy over time, temperature, and external stresses.

There is accordingly a need in the art form methods of aligning optical elements that accounts effectively for these issues.

BRIEF SUMMARY OF THE INVENTION

Embodiments of the invention provide methods of fabricating optical assemblies that achieve effective optical alignment of an active optical element with a passive optical element. But rather than use active sub-micron alignment of separate active and passive optical elements, a fabrication methodology is adopted that combines photolithographic alignment with fabrication of at least the passive optical element and perhaps also of the active optical element. The passive optical element may be fabricated directly on the same substrate as the active optical element or maybe fabricated on another substrate that has been affixed to the active-element substrate by wafer bonding or some other technique known to those of skill in the art.

Such techniques produce structures that have highly efficient matching of the light between the active and passive optical elements and provide a rigid structure that remains stable over time, temperature, and external stresses. The active optical element generally comprises a light detector or a light source, examples of which include laser diodes, light-emitting diodes, and VCSELs, among others. The passive optical element sometimes comprises a collimation element such as a reflective, refractive, and/or diffractive lens, but may comprise other optically passive structures in different embodiments.

The combination of fabrication with lithographic alignment thus achieves a number of benefits over other techniques.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and is enclosed in parentheses to denote one of multiple similar components. When reference is made to a reference numeral without specification to an existing sublabel, it is intended to refer to all such multiple similar components.

DETAILED DESCRIPTION OF THE INVENTION

Embodiments of the invention provide methods of fabricating an optical assembly that address the various issues described above in achieving effective alignment of separate optical components. Such embodiments make use of wafer lithography techniques to achieve very precise overlay of components, typically to tolerances better than 0.5 µm. The embodiments are described for fabrication of an optical assembly that comprises an active optical element and a passive optical element that are aligned using a slab of optical material. The slab of optical material generally has a front side and a back side that define outside surfaces of the slab. While it is generally preferred that the outside surfaces are substantially parallel, this is not a requirement of the invention and they may be nonparallel in other embodiments.

The front side typically comprises a direct semiconducting material, which may be an elemental material such as silicon or germanium or which may be a compound such as a III-V, II-VI, or even a I-VII semiconducting material. In some instances, the front side comprises an alloy of such a direct semiconducting material. The front side may also be provided as a single layer of material or may comprise a plurality of layers in different embodiments, sometimes containing nanoparticles and/or quantum dots or other structures that may be used to provide efficient light production.

The back side may comprise the same material as the front side in many embodiments, but this is not a requirement of the invention and there are many other embodiments in which the back side comprises a material different than that comprised by the front side. Similar to the front side, the back side may be provided as a single layer of material or may comprise a plurality of layers. In at least one embodiment, a single layer of optical material acts as both the front side and the back side. But in embodiments where they comprise different layers, the front side and back side of the slab of optical material may be affixed with each other through deposition, bonding, or other techniques known to those of skill in the art for affixing layers. Examples of material that may be used in specific embodiments for the back side include SiN, SiO, quartz, sapphire, silicon, and others.

The active optical element may comprise a light source such as a laser diode, a light-emitting diode, a vertical cavity surface emitting laser, or the like, or may comprise a light detector. The passive optical element may comprise a lens, a grating, a prism, a grism, a mirror or other reflective surface, or any other nonactive optical element in different embodiments. In certain specific embodiments, the passive optical element comprises a collimation element.

Figure 1:
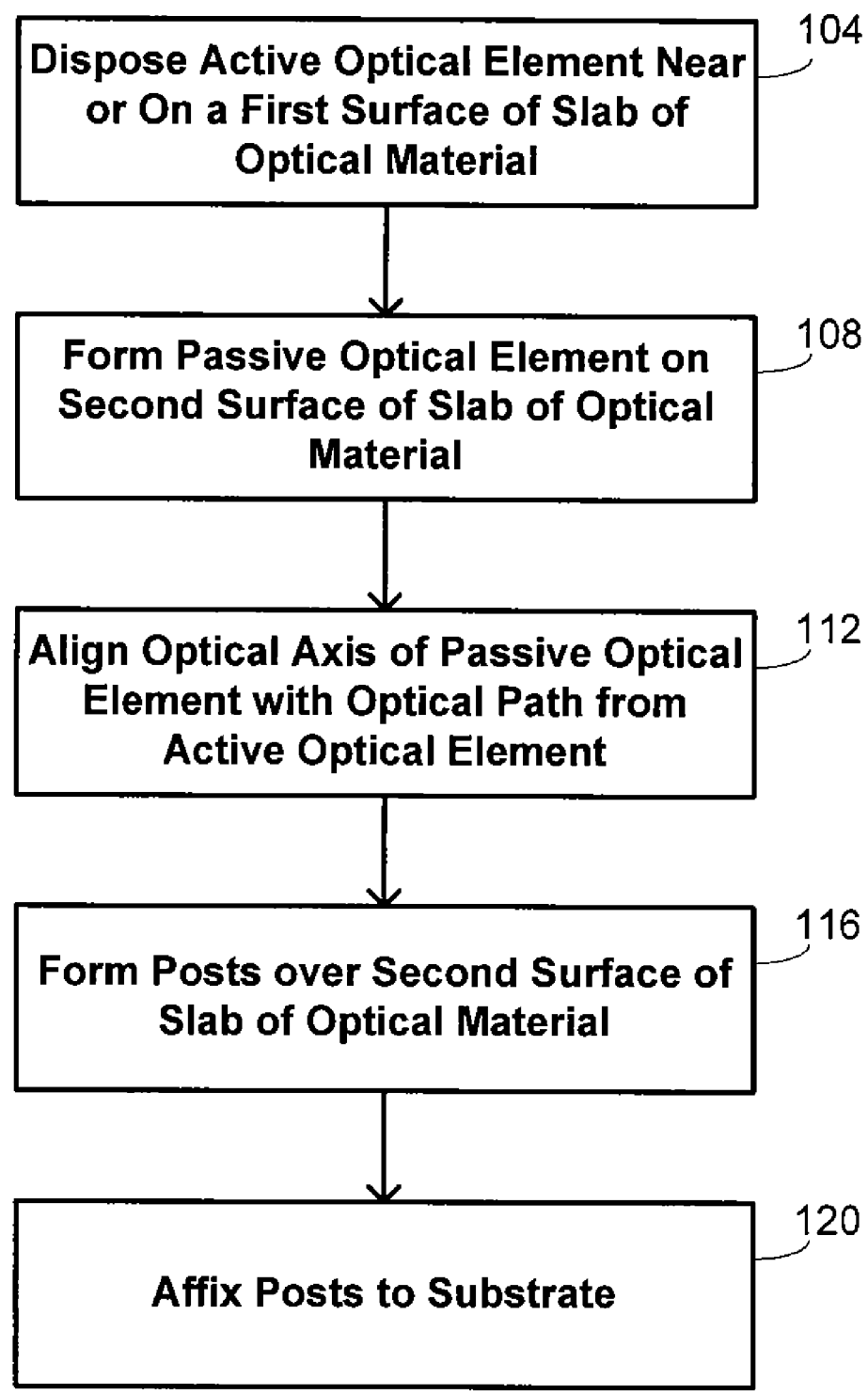
FIG. 1 is a flow diagram that summarizes methods of fabricating optical assemblies in accordance with embodiments of the invention.

A general overview of methods of fabricating the optical assembly is thus provided with the flow diagram of FIG. 1. Although the flow diagram sets forth specific steps and provides those steps in a specific order, this is not intended to be limiting. Other steps that are not specifically indicated may sometimes be performed in addition, some of the steps may sometimes be omitted, and the order in which the steps are performed may be varied in certain embodiments. For example, block 104 indicates that an active optical element is disposed near or on a first surface of the slab of optical material and block 108 indicates that a passive optical element is formed on a second surface of the slab of optical material. While certain embodiments dispose the active optical element before the passive optical element is formed, other embodiments perform these steps in the opposite order or perform them simultaneously.

Furthermore, references to the "first" and "second" surfaces are intended to be generic. That is, in some embodiments, the active optical element is disposed over the front side of the slab, which acts as the "first" surface and the passive optical element is formed over the back side, which acts as the "second" surface. But in other embodiments, the first and second surfaces are both the front side of the slab of optical material so that the active and passive optical elements are provided on the same side. Such embodiments are especially suitable for flip-chip mounting applications. The first are second surfaces are also sometimes required to be "parallel." Such terminology is intended to cover instances in which the first and second surfaces are the same surface; that is a surface is axiomatically "parallel" with itself.

Block 112 of FIG. 1 indicates that an optical axis of the passive optical element is aligned with an optical path from an active region of the active optical element. Such alignment may be performed using wafer lithographic techniques. For example, substrate alignment marks may be created on the first and second surfaces and used as a reference for the manufacture of the active and passive optical elements. If the optical elements are manufactured on opposite sides, backside alignment or through-wafer alignment techniques may be used. Such techniques permit primary alignment marks to be disposed on one of the surfaces and used to place secondary alignment marks on the other surface with high accuracy. If the optical elements are manufactured on the same side, i.e. when the first and second surfaces are the same surface, it is possible to achieve the desired alignment with a single set of alignment marks.

Other lithographic approaches that may be used in embodiments where the first and second surfaces are different include the use of wafer-bonding techniques. For example, in one such embodiment, the active optical element is disposed on the first surface on a first substrate at block 104 and the passive optical element is formed on the second surface of a separate second substrate. High-precision alignment of wafer bonding is then used to align the optical elements with respect to each other. Such an approach is generally more difficult and less accurate than some of the other techniques described herein.

Another technique comprises manufacturing alignment marks on the second surface of a separate second substrate and bonding the second surface to the first substrate. Such bonding may be performed with relatively poor accuracy without comprising the ultimate alignment of optical elements. Manufacture of precision-aligned optical elements on the second surface with respect to the first surface may then be achieved by characterizing the offset between the first and second surfaces and using that characterization as a correction factor in placing the optical elements relative to each other.

Still another alignment technique may be used in those embodiments where the front side and back side are comprised by a single substrate. The substrate may be highly parallel, such as is common in silicon wafer manufacturing. In such embodiments, the naturally parallel nature of the first and second surfaces corresponding to the front and back sides permits reflections off of them to simplify further alignment of the remaining axes or focal points.

The structure formed at blocks 104-112 of FIG. 1 produces a structure in which the active optical element is well aligned with the passive optical element. For example, when the active optical element comprises a light source and the passive optical element comprises a collimation element, the structure may produce a collimated expanded beam. A remaining concern may be angular alignment of the collimated beam with respect to a wafer on which the constructed assembly may be placed. Gluing the assembly onto the wafer requires applying glue and ensuring that there are no bubbles in the glue. This may be accomplished by using an excess of glue and squeezing some of the excess out from the gap. But such squeezing makes it difficult to control alignment between the active optical element and the wafer and there is a risk of the passive optical element hitting the wafer to produce a pivot point that complicates achieving the desired angular precision.

These issues may be addressed as indicated at block 116 of FIG. 1 by forming at least three posts over the second surface of the slab of optical material. Such posts thus define a plane and are produced to be taller than the passive optical element. When placing glue to affix the posts to the wafer substrate at block 120, and thereby to affix the optical assembly to the wafer substrate, it is then possible to press hard on the optical assembly until the posts encounter the wafer substrate. The glue flows easily out from the gap and substantially void-free seal is achieved. Because the posts define a plane substantially parallel to the second surface, angular alignment of the active optical element relative to the wafer substrate is achieved. And because the posts have a height greater than that of the passive optical element, the passive optical element is protected from contacting a surface of the wafer substrate and suffering damage.

There are a number of techniques that may be used to fabricate such posts. One method etches them into the second surface at the same time that the passive optical element is fabricated. This may be done using reflow methods such as described in U.S. Prov. Pat. Appl. No. 60/805,010, entitled "Method of Patterning 3D Features in Silicon for Optoelectronic Applications," the entire disclosure of which is incorporated herein by reference for all purposes. Resist is deposited over the second surface and then caused to reflow to create the passive optical element and to create the posts. Choosing one diameter for the passive optical element and a larger diameter for each of the posts results in a resist reflow taller than that of the passive optical element. Etching the structures substantially simultaneously thus first completes the passive optical element and a subsequent overetch completes the posts. In some embodiments, the posts themselves are created as passive optical elements similar in optical functionality to the passive optical element, even if those optical properties are not used in the resulting structure.

In other embodiments, the area where the passive optical element is to be manufactured is recessed by patterned etch prior to the reflow of the resist and prior to the simultaneous etch of posts and passive optical element. This achieves a wider margin of post-to-optical-element height offset, making the process easier to control. A further alternative comprises manufacturing the posts on a small pattern of dielectric that is chosen to etch at a significantly slower rate than the material used to form the passive optical element. The resulting structure still includes posts that are taller than the passive optical element, while decoupling the reflow characteristics of the resist for different diameters from the final height of the posts relative to the passive optical element.

A number of examples of structures that may be created using the methods described generally in connection with FIG. 1 are illustrated in FIGS. 2-8. It is worth remarking on certain general characteristics of such structures in those embodiments where the active optical element comprises a light source and the passive optical element comprises a collimation element. The structure is organized around the slab of optical material, which has two surfaces. The optical source created at the first surface emits an optical beam that is directed towards the second surface, either directly or through the interaction with other optical elements. For example, a mirror, lens, grating, or other optical structure may be used to direct the beam as appropriate to the second surface, with the alignment described above being used to ensure that the beam is directed accurately towards the optical axis of the collimation element.

The beam generated by the light source is generally dispersive so that the collimation element acts to collimate the light emanating from the first surface. The optical element on the second surface thus forms a larger beam than the beam emitted from the first surface so that the combined effect of traversing the optical path and being operated on by the collimation element is to produce an expanded collimated beam.

Pick-and-place functions are greatly simplified by the larger size of the beam, which allows tolerances within standard pick-and-place tools using passive placement strategies The angular tolerance of the larger beam is more stringent for single-mode applications. But the second surface may be configured to provide a high-quality passive reference plane for mechanical placement, especially for contact of one planar piece to another parallel planar piece.

The resulting configurations of the optical assembly thus satisfy a number of issues raised above regarding the effective couple of light in or out of an optical package. First, the optical beam may be formed to efficiently match the beam shape between the parts. In particular, optics on the first and second surfaces may be engineered to create beams with better matched size, divergence, and collimation angles as appropriate.

Second, the parts may be aligned mechanically to high accuracy for high-efficiency coupling that often requires active feedback from optical beams traversing the structure to measure the alignment position properly. Such a procedure would conventionally require one or more optical components to be powered to emit or detect light, and securing them while aligned. Such a power-on active alignment process is difficult but the use of high-precision lithography to manufacture the passive and active optical elements with high alignment accuracy perms an expanded beam that is tolerant to the mechanical accuracy of a passive pick-and-place tool. Such a tool looks only at marks made on the surfaces as part of the lithographic manufacture, avoiding the need to have optical parts that are activated during the alignment procedure.

Third, a rigid structure results that remains stable with high accuracy over time, temperature, and external stresses. In particular, the mating of planar surfaces can be very accurate and stable over time, temperature, and stresses.

Figure 2:
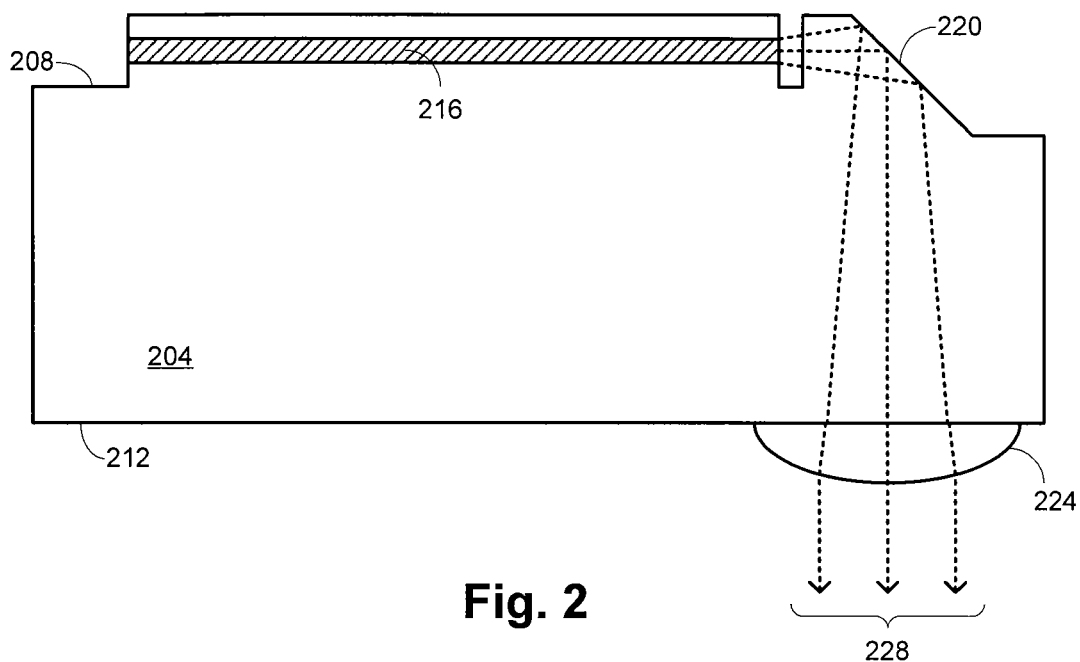
FIG. 2 is a schematic diagram that illustrates a first structure that may be fabricated with the method of FIG. 1.

FIG. 2 illustrates a structure in which an optical assembly has been fabricated using the methods of FIG. 1 with a slab 204 of optical material having a first surface 212 that corresponds to a front side and a second surface 208 that corresponds to a back side. Although shown as a single structure, the slab 204 may comprise a plurality of layers in other embodiments, such as by including wafer-bonded layers or layers affixed to each other with another mechanism. The active optical element comprises an edge-emitting laser 216 formed at the first surface 212. The passive optical element comprises a lens 224 fabricated at the second surface 208. Light 228 emitted from the edge-emitting laser 216 is directed from the first surface 212 to the second surface 208 with an external mirror 220 that is lithographically aligned with the optical axis of the lens 224 to direct the light 228 in the appropriate fashion. The shaped beam emanates as a substantially collimated beam from the slab 204 through the lens 224.

Figure 3:
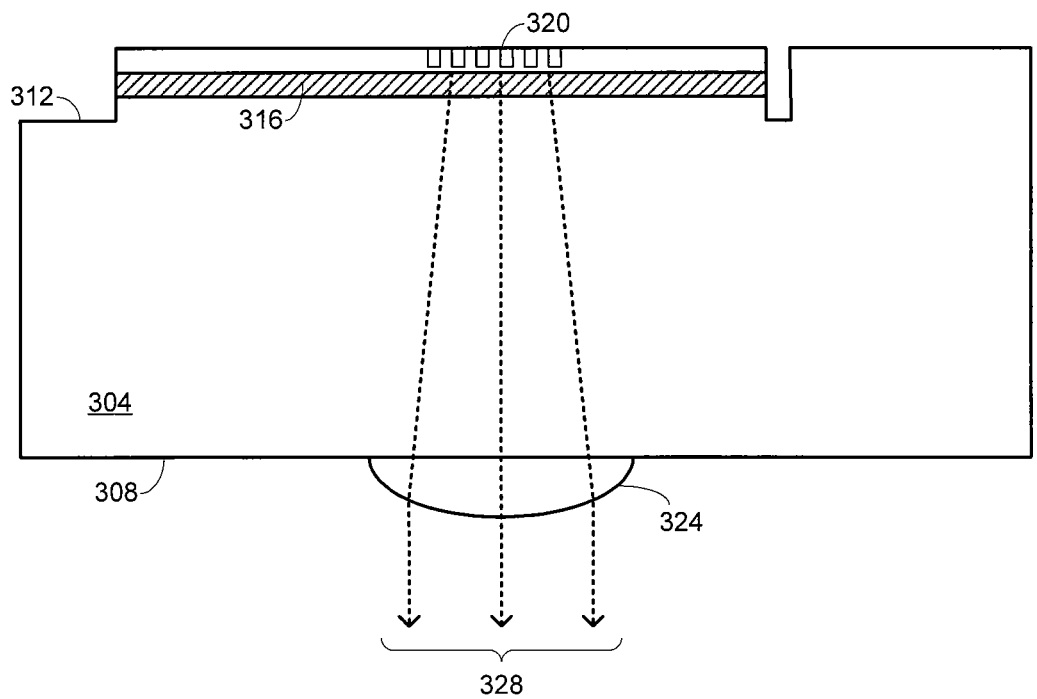
FIG. 3 is a schematic diagram that illustrates a second structure that may be fabricated with the method of FIG. 1.

FIG. 3 illustrates a structure in which an optical assembly has been fabricated using the methods of FIG. 1 with a slab 304 of optical material having a first surface 312 that corresponds to a front side and a second surface 308 that corresponds to a back side. The slab 304 is shown for illustrative purposes as a single layer but comprise a plurality of layers in other embodiments. Wafer bonding and other techniques known to those of skill in the art may be used to affix the layers in such embodiments. The active optical element comprises an edge-emitting laser with an internal diffraction-grating outcoupler 320 formed at the first surface 312. The passive optical element comprises a lens 324 fabricated at the second surface 308. Light 328 emitted from the edge-emitting laser 316 is directed by the internal diffraction-grating outcoupler 320 to propagate directly through the slab 304 to the lens 324. The resulting beam is a shaped optical beam that emanates substantially collimated by the lens 324.

Figure 4:
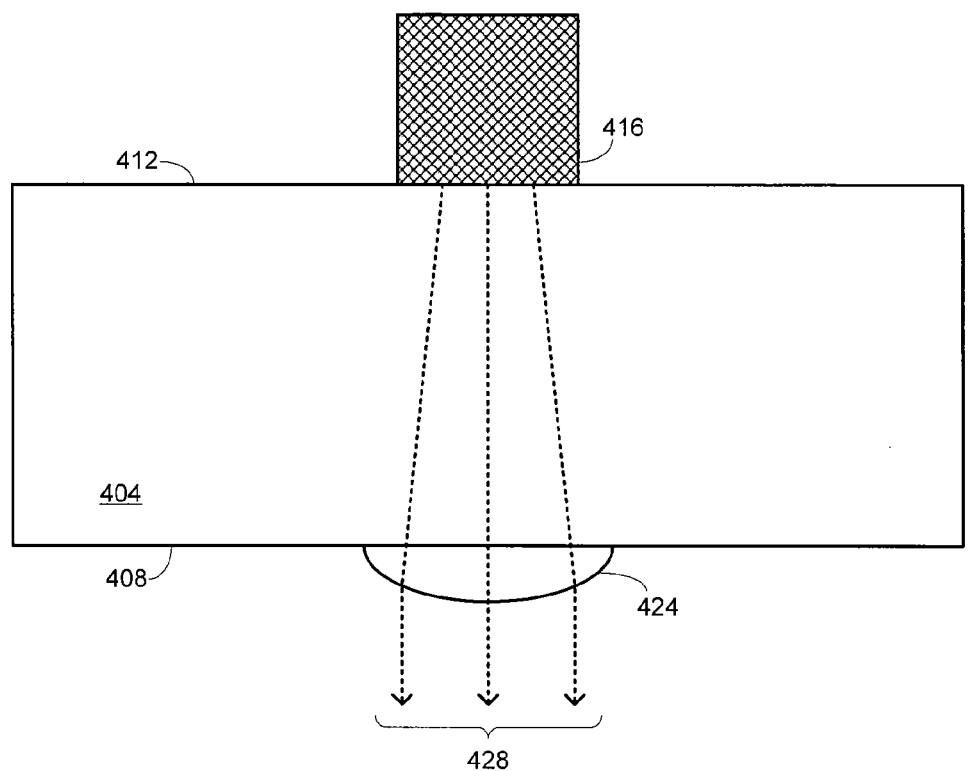
FIG. 4 is a schematic diagram that illustrates a third structure that may be fabricated with the method of FIG. 1.

FIG. 4 shows a structure in which an optical assembly has been fabricated using the methods of FIG. 1 with a slab 404 of optical material having a first surface 412 that corresponds to a front side and a second surface 408 that corresponds to a back side. The slab 404 may comprise a single layer of material or may comprise a plurality of layers affixed together through wafer bonding or another technique known to those of skill in the art. The active optical element 416 in this example comprises a VCSEL that has been lithographically aligned with a lens 424 on the back side that corresponds to the passive optical element. Light 428 emitted from the VCSEL 416 propagates directly through the slab of optical material to be collimated by the lens 424 and to emanate from the structure as a shaped beam of light.

Figure 5:
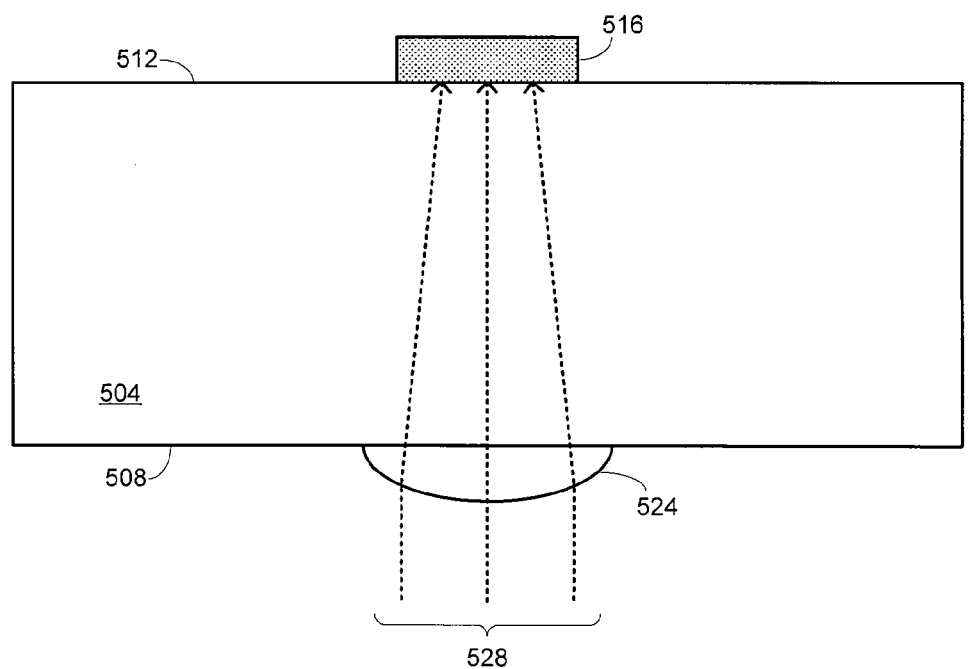
FIG. 5 is a schematic diagram that illustrates a fourth structure that may be fabricated with the method of FIG. 1.

FIG. 5 provides an example in which an optical assembly uses a light detector as an active element. The structure shown in FIG. 5 is generally similar to the structure shown in FIG. 4, but uses light propagated in the opposite direction. The structure may be fabricated using the methods of FIG. 1 with a slab 504 of optical material having a first surface 512 that corresponds to a front side and a second surface 508 that corresponds to a back side. As in the other examples, the slab 504 may comprise either a single layer of material or may comprise multiple layers affixed together by wafer bonding or some other affixation method. In this example, the passive optical element 524 comprises a lens that acts to focus collimated light 528 towards the light detector 516 that functions as the active optical element.

Figure 6:
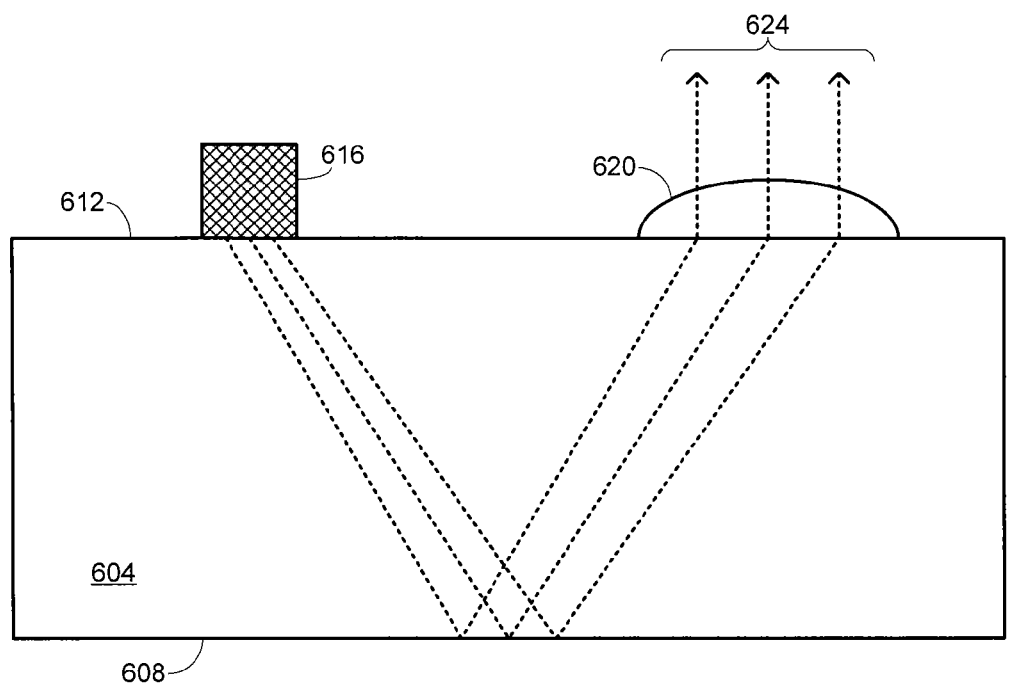
FIG. 6 is a schematic diagram that illustrates a fifth structure that may be fabricated with the method of FIG. 1.

FIG. 6 illustrates a structure fabricated using the methods of FIG. 1 in which a single surface acts as both the first surface and the second surface. The structure is fabricated with a slab 604 of optical material having a front side 612 that acts as the first and second surface and a back side 608 that acts as a third surface. In this instance, the active optical element comprises a VCSEL 616 and the passive optical element comprises a lens 620. The structure operates in a manner similar to that of FIG. 4 in that light generated by the VCSEL is transmitted to the lens 620 and collimated to emanate from the structure as a shaped beam. But instead of propagating directly through the slab 604, the light undergoes a reflection at the third-surface back side as part of the optical path followed. In such an embodiment, alignment of the lens is achieved laterally relative to the laser emission point. Depending on the position of the lens, the laser beam might not be pointed directly vertically, as illustrated in the drawing. Of note, the back side need not be aligned in such an embodiment, provided that it is substantially planar and of a known angle relative to the front side. Alignment instead depends primarily on the front-side position of the optical elements. For proper collimation of the light 624, the thickness of the slab 604 should be well determined for lateral position of the optical axis.

Figure 7:
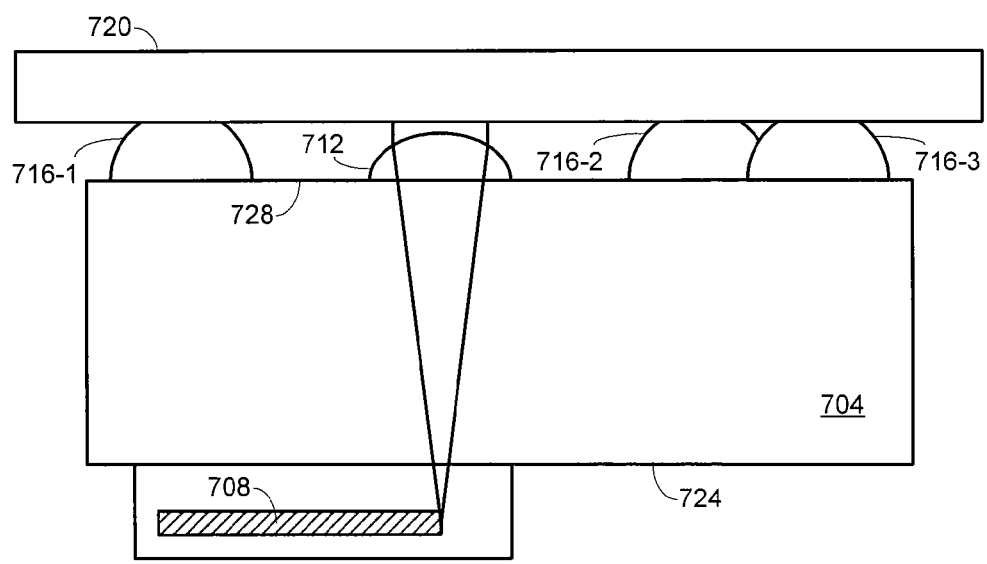
FIG. 7 is a schematic diagram that illustrates a sixth structure that may be fabricated with the method of FIG. 1.

FIG. 7 shows an embodiment that makes use of the at least three posts to affix the optical assembly with a wafer substrate. The structure of the optical assembly is generally similar to that of FIG. 2, with an edge-emitting laser 708 acting as the active optical element that generates light to be transmitted through a slab 704 of optical material from a first surface 724 that acts as the front side to a lens 712 on a second surface 728 that acts as the back side. The drawing shows three posts 716 formed using one of the methods described above. The use of three posts is sufficient to define a plane, although a greater number of posts may sometimes be used in other embodiments. The drawing shows the posts 716 having a greater height above the second surface than does the lens 712, allowing the wafer substrate 720 to be glued to the posts 716 without damaging the lens 712 as described above. In some embodiments, the posts have a substantially spherical shape.

Figure 8:
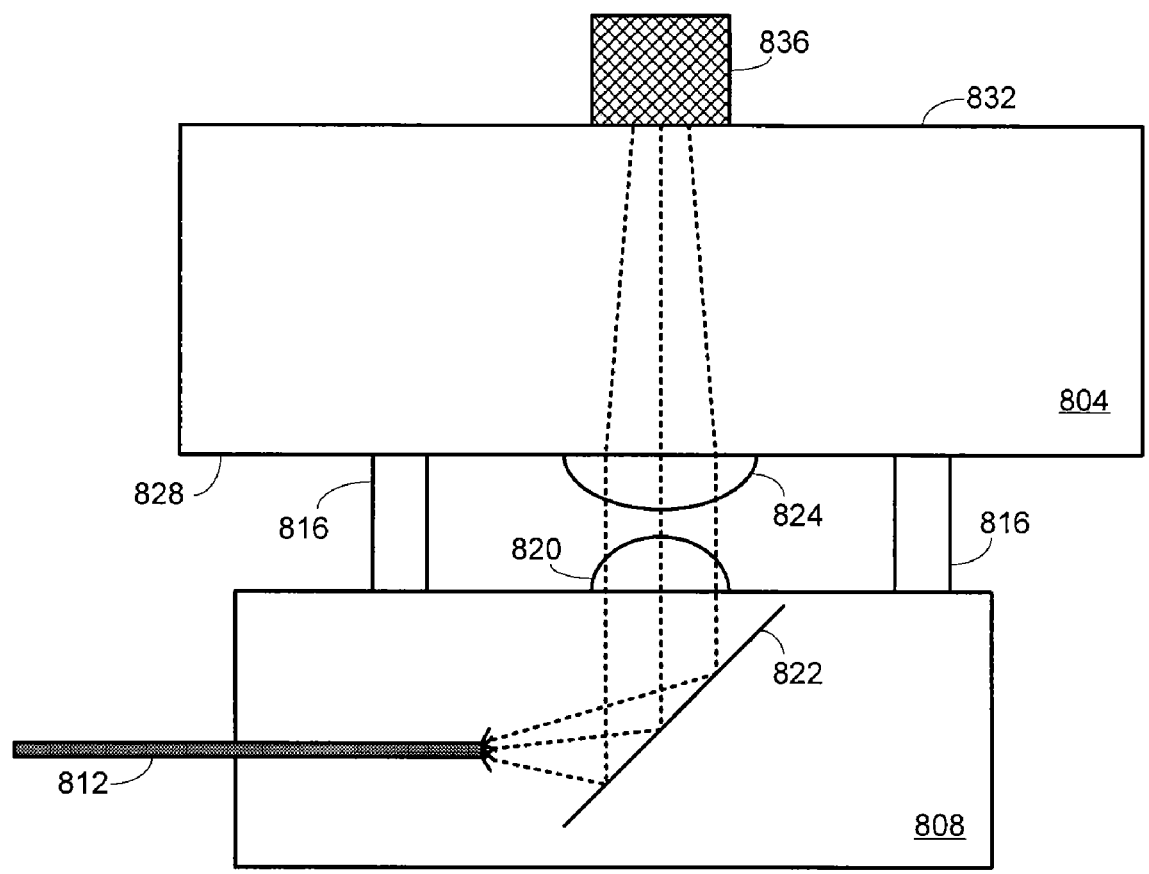
FIG. 8 is a schematic diagram that illustrates a seventh structure that may be fabricated with the method of FIG. 1.

FIG. 8 provides a further example in which an optical coupler is used to align the collimated beam produced by the optical assembly with an optical fiber with high precision. In this drawing, the optical structure is generally similar to that shown in FIG. 4, with a VCSEL 836 acting as the active optical element that generates light to be transmitted through a slab 804 of optical material from a first surface 832 that acts as the front side to a lens 824 formed on a second surface 828 that acts as the back side. Light emanating from the lens 824 propagates to a surface-mounted optical coupler 808 that couples light received from the optical assembly into an optical fiber 812. The optical coupler 808 comprises its own lens 820 and a reflective surface 822 to direct from the optical assembly into the optical fiber 812. The appropriate angle of the optical coupler 808 is determined relative to the plane of the collimating surface and may be defined by using elements such as posts or larger-diameter rings 816 on the optical coupler that define a planar reference relative to the back side of the optical assembly to which it is mated.

Having fully described several embodiments of the present invention, many other equivalents or alternative embodiments of the present invention will be apparent to those skilled in the art. The scope of the invention should, therefore, be determined not with reference to the above description, but instead should be determined with reference to the appended claims along with their full scope of equivalents.

What is claimed is:

1. Method of fabricating an optical assembly, the method comprising:
    disposing an active optical element near or on a first surface of a slab of optical material;
    forming a passive optical element on a second surface of the slab of optical material, wherein the second surface is substantially parallel to the first surface; and
    aligning an optical axis of the passive optical element with an optical path between the passive optical element and an active region of the active optical element using a lithographic alignment process that includes manufacturing alignment marks on either or both of the first surface and the second surface using a lithographic technique.

2. The method recited in claim 1 wherein the second surface is the first surface.

3. The method recited in claim 2 wherein the optical path comprises a reflection from a third surface parallel to and spaced apart from the first surface.

4. The method recited in claim 1 wherein the second surface is spaced apart from the first surface.

5. The method recited in claim 4 wherein the optical path comprises a path through the slab of optical material.

6. The method recited in claim 1 wherein the active optical element comprises a light source.

7. The method recited in claim 1 wherein the active optical element comprises a light detector.

8. The method recited in claim 1 further comprising forming a reflective surface on or within the slab of optical material, wherein the optical path comprises a path through the slab of optical material and including a reflection from the reflective surface.

9. The method recited in claim 1 wherein the passive optical element comprises a lens.

10. The method recited in claim 1 further comprising:
    forming at least three posts over the second surface to define a plane; and
    affixing the posts to a substrate.

11. The method recited in claim 10 wherein the plane is substantially parallel to the second surface.

12. The method recited in claim 10 wherein forming the passive optical element and forming the at least three posts comprises:
  depositing a layer of resist over the second surface;
  etching the layer of resist in positions of the passive optical element and of the at least three posts; and
  reflowing the resist to form the passive optical element and the at least three posts.

13. The method recited in claim 12 wherein etching the layer of resist in positions of the passive optical element and of the at least three posts is performed substantially simultaneously.

14. The method recited in claim 12 wherein etching the layer of resist in positions of the passive optical element and of the at least three posts comprises etching the layer of resist in the position of the passive optical element prior to etching the layer of resist in the positions of the at least three posts.

15. The method recited in claim 10 wherein:
forming the passive optical element comprises:
  depositing a pattern of a first material over the second surface in a position of the passive optical element; and
  etching the pattern of first material; and
forming the at least three posts comprises:
  depositing a pattern of a second material over the second surface in positions of the at least three posts, the second material having slower etch characteristics than the first material; and
  etching the pattern of second material.

16. The method recited in claim 15 wherein:
the first material comprises a resist; and
the second material comprises a dielectric.

* * * * *